(12) United States Patent
Cantrill

(10) Patent No.: US 7,302,542 B1
(45) Date of Patent: Nov. 27, 2007

(54) MECHANISM FOR DYNAMICALLY-ALLOCATED VARIABLES IN AN ARBITRARY-CONTEXT TRACING FRAMEWORK

(75) Inventor: Bryan M. Cantrill, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 420 days.

(21) Appl. No.: 10/713,176

(22) Filed: Nov. 14, 2003

(51) Int. Cl.
*G06F 12/00* (2006.01)
(52) U.S. Cl. .................................................. 711/170
(58) Field of Classification Search ................ None
See application file for complete search history.

(56) References Cited

U.S. PATENT DOCUMENTS

| | | | | |
|---|---|---|---|---|
| 5,088,036 A | * | 2/1992 | Ellis et al. | 707/206 |
| 5,689,707 A | * | 11/1997 | Donnelly | 707/206 |
| 6,076,151 A | * | 6/2000 | Meier | 711/171 |
| 6,125,434 A | * | 9/2000 | Willard et al. | 711/170 |
| 6,144,970 A | * | 11/2000 | Bonner et al. | 707/206 |
| 6,598,141 B1 | * | 7/2003 | Dussud et al. | 711/170 |
| 6,622,226 B1 | * | 9/2003 | Dussud | 711/159 |
| 6,874,074 B1 | * | 3/2005 | Burton et al. | 711/170 |
| 2002/0199172 A1 | * | 12/2002 | Bunnell | 717/128 |

OTHER PUBLICATIONS

Tamches, Ariel and Miller, Barton P. Fine-Grained Dynamic Instrumentation of Commodity Operating System Kernels. [Online] http://www.usenix.org/publications/library/proceedings/osdi99/full_papers/tamches/tamches.pdf, Published Feb. 1999.

Murayama, John. Performance Profiling Using TNF; [Online] http://developers.sun.com/solaris/articles/tnf.html, Jul. 2001.

Chapter 10. The Generalized Trace Facility (GTF). [Online] http://publib.boulder.ibm.com/cgi-bin/bookmgr/BOOKS/IEA2V100/CCONTENTS, Jan. 2001.

Mirgorodskii, Alex. The Path to Portable Kernel Instrumentation: The Kerninst API. http://www.dyninst.org/mtg2003/slides/KerninstAPI.pdf, Apr. 2003.

Richard Moore, et al. IBM Dynamic Probes http://www-124.ibm.com/developerworks/opensource/linux/projects/dprobes/README, 2000.

(Continued)

*Primary Examiner*—Hyung Sough
*Assistant Examiner*—Craig E Walter
(74) *Attorney, Agent, or Firm*—Osha Liang LLP

(57) ABSTRACT

A method of dynamically allocating a variable in a tracing framework, including allocating a dynamic memory in the tracing framework having a plurality of data chunks, placing at least one of the plurality of data chunks onto a free list, allocating the at least one of the plurality of data chunks on the free list to store the variable and removing the at least one of the plurality of data chunks from the free list, deallocating the at least one of the plurality of data chunks and placing the at least one of the plurality of data chunks on a dirty list, and cleaning the at least one of the plurality of data chunks on the dirty list using a cleaning procedure to place the one of the plurality of data chunks on the free list.

20 Claims, 7 Drawing Sheets

OTHER PUBLICATIONS

K. Yaghmour et al.; "Measuring and Characterizing System Behavior Using Kernel-Level Event Logging"; Proceeding of the 2000 USENIX Annual Technical Conference; Jun. 18-23, 2000, San Diego, California, USA.

Lorch, Jacob R. and Smith, Alan J. The VTrace Tool: Building a System Tracer for Windows NT and Windows 2000. [Online ]http://msdn.microsoft.com/msdnmag/issues/1000/Ttrace/default.aspx, Oct. 2000.

* cited by examiner

MECHANISM FOR DYNAMICALLY-ALLOCATED VARIABLES IN AN ARBITRARY-CONTEXT TRACING FRAMEWORK

BACKGROUND

Analyzing the dynamic behavior and performance of a complex software system is difficult. Typically, analysis of a software system is achieved by gathering data at each system call and post-processing the data. The following is a brief description of conventional tracing frameworks.

Conventional tracing frameworks are typically composed of various independent software modules. The primary source of information accessed by the conventional tracing frameworks is the kernel. The conventional tracing frameworks typically include a trace facility, a trace module, a daemon, and an offline data analysis and processing component. The trace facility gathers information from various components of the kernel and forwards events to the trace module. The trace module subsequently logs the events in its buffer. Periodically, the trace daemon reads the events from the trace module buffer and commits the recorded events into a user-provided file.

The trace facility is an extension to the core kernel facilities. The trace facility provides a unique entry point to all of the other kernel facilities requesting or requiring that an event be traced. Such events are not logged, but instead, the trace request is forwarded to the trace module. If the trace module is compiled as part of the kernel, then the trace module achieves this functionality by registering itself with the trace facility upon system startup. Otherwise, if the trace module is compiled and loaded as a separate module, then the registration takes place when the trace module is loaded.

During the registration process, the trace module provides the trace facility with a call-back function that is called whenever an event occurs. If no trace module is registered, then the traced events are ignored. Furthermore, the registration process provides the trace module with the ability to configure the manner in which the instruction pointer values are recorded upon the occurrence of a system call. Once configured, the kernel browses the stack to find an instruction pointer matching the desired constraints whenever a system call occurs. In summary, the kernel trace facility acts as a link between the trace module and the different kernel facilities.

The trace module stores the incoming event descriptions and delivers them efficiently to the daemon. More specifically, the trace module retrieves additional information for each event occurring in the kernel. This additional information includes the time at which the event occurred and the CPU identifier for the event.

The primary function of the daemon is to retrieve and store the information accumulated by the trace module, typically in a file. The daemon provides the user with a number of options to control the tracing process. In addition to giving the user access to the options available from the trace module, the daemon allows the user to specify the tracing duration. Once the daemon is launched, the daemon opens and configures the trace module, and sets a timer if a time duration was specified. Otherwise, the user terminates the daemon process manually to stop the trace.

During normal operation, the daemon typically sleeps, awaiting a signal to read from the trace module, or timer/terminate events to end tracing. Similar to the trace module, the daemon uses double buffering. When the daemon receives a signal from the trace module, the daemon reads the content of the buffer denoted as the read buffer and appends the content to the content in an associated internal buffer (not shown). Once the internal buffer is full, the contents of the internal buffer is committed to a file and, during this process, a second internal buffer is used to record the incoming data.

To enable processing of the event data, conventional tracing frameworks typically require the state information for the software system state prior to performing the trace. Specifically, the daemon reviews one or more system directories and records the following characteristics for each process: 1) process ID; 2) name; and 3) parent's process ID. The state information is typically retrieved after the configuration of the trace module and prior to the start of the trace. The information retrieved is stored in a file that is later used by the analysis software. Unlike the aforementioned components of the conventional tracing framework described above, the data analysis and presentation software is typically run off-line. The software uses both the initial process state and the trace data files created by the daemon to recreate the dynamic behavior of the system in a particular, observed time interval. Collating and sorting utilities with the software are used to display the stored information at the user-level.

Conventional tracing frameworks, such as the one described above, are typically designed to provide static behavior or dynamic behavior. The conventional tracing frameworks that provide static behavior are configured to perform predefined actions at predefined points within the instrumented program (i.e., the program being traced). In contrast, conventional tracing frameworks that provide dynamic behavior allow the user to configure the tracing framework to perform actions that may optionally manipulate user-defined variables. These user-defined variables are typically global and statically allocated.

SUMMARY

In general, in one aspect, an embodiment of the invention relates to a method of dynamically allocating a variable in a tracing framework, comprising allocating a dynamic memory in the tracing framework having a plurality of data chunks, placing at least one of the plurality of data chunks onto a free list, allocating the at least one of the plurality of data chunks on the free list to store the variable and removing the at least one of the plurality of data chunks from the free list, deallocating the at least one of the plurality of data chunks and placing the at least one of the plurality of data chunks on a dirty list, and cleaning the at least one of the plurality of data chunks on the dirty list using a cleaning procedure to place the one of the plurality of data chunks on the free list.

In general, in one aspect, an embodiment of the invention relates to a system for dynamically allocating a variable, comprising a dynamic memory configured to store a plurality of data chunks, a consumer dynamic memory state associated with the dynamic memory configured to store a state of the state dynamic memory, and a tracing framework configured to allocate the variable to one of the plurality of data chunks using the consumer dynamic memory state.

In general, in one aspect, an embodiment of the invention relates to a network system having a plurality of nodes. The network system comprises a dynamic memory configured to store a plurality of data chunks, a consumer dynamic memory state associated with the dynamic memory configured to store a state of the state dynamic memory, and a tracing framework configured to allocate the variable to one of the plurality of data chunks using the consumer dynamic memory state, wherein the dynamic memory executes on any node of the plurality of nodes, wherein the consumer dynamic memory state executes on any node of the plurality of nodes, and wherein the tracing framework executes on any node of the plurality of nodes.

Other aspects of the invention will be apparent from the following description and the appended claims.

DETAILED DESCRIPTION

Figure 1:
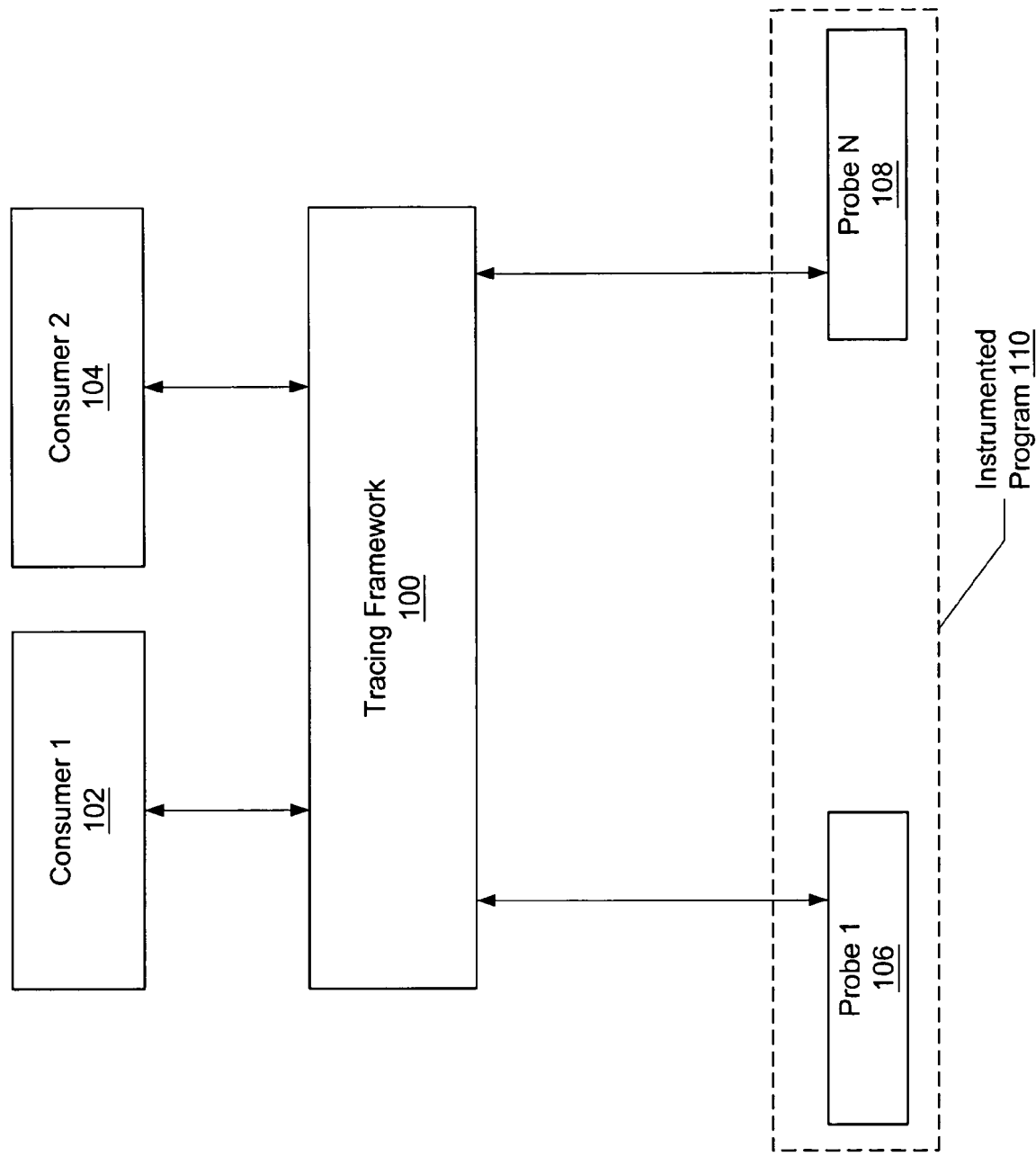
FIG. 1 shows a flow diagram in accordance with one embodiment of the invention.

Exemplary embodiments of the invention will be described with reference to the accompanying drawings. Like items in the drawings are shown with the same reference numbers. Further, the use of "ST" in the drawings is equivalent to the use of "Step" in the detailed description below.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention provide a means for dynamically allocating a dynamic variable. More specifically, embodiments of the invention provide a means to dynamically allocate variables, such as associative arrays and thread-specific variables, in the context of a firing probe, i.e., the dynamic variable may be requested and subsequently allocated when a probe fires (i.e., when a thread executing an instrumented program encounters the probe).

FIG. 1 shows a flow diagram in accordance with one embodiment of the invention. More specifically, FIG. 1 shows a system in which the invention may be implemented. As shown in FIG. 1, the tracing framework (100) interacts with one or more consumers (102, 104) and one or more probes (106, 108) located in an instrumented program (110).

In one or more embodiments of the invention, the tracing consumer (102, 104) is a virtual client, which defines one or more tracing functions (i.e., defines which of the provided probes to enable and what actions to perform when the probes are encountered during tracing of the instrumented program). The tracing functions are retrieved by the tracing framework (100) and subsequently analyzed to determine which probes within the instrumented program (110) to enable. Note, once a consumer has enabled a particular probe, the probe is associated with the tracing consumer. The consumer (102, 104) also retrieves the resulting information obtained from performing the actions defined by the consumer when the enabled probes are encountered during execution of the instrumented program (110). Those skilled in the art will appreciate that the aforementioned components may reside on one system. Alternatively, the components may be distributed across a plurality of nodes (i.e., distributed processors) and communicate, for example, via a network.

In one or more embodiments of the invention, when an enabled probe is encountered by a thread executing the instrumented program, a call is made into the tracing framework. The tracing framework subsequently performs the actions associated with the probe. Prior to performing any actions associated with the probe, the interrupts on the processor on which the probe fired are disabled. Once the tracing framework has completed performing the actions the interrupts are re-enabled and the thread executing the instrumented program on the processor continues executing the instrumented program.

In one embodiment of the invention, the tracing framework (or a related process) allocates dynamic memory within a given system on a per-consumer per-processor basis. This dynamic memory may be dynamically allocated by the tracing framework (or a related process) during tracing. In addition, the tracing framework associates a per-consumer dynamic memory state with the dynamic memory. The per-consumer dynamic memory state is used to denote the state of all dynamic memory associated with a given consumer.

Figure 2:
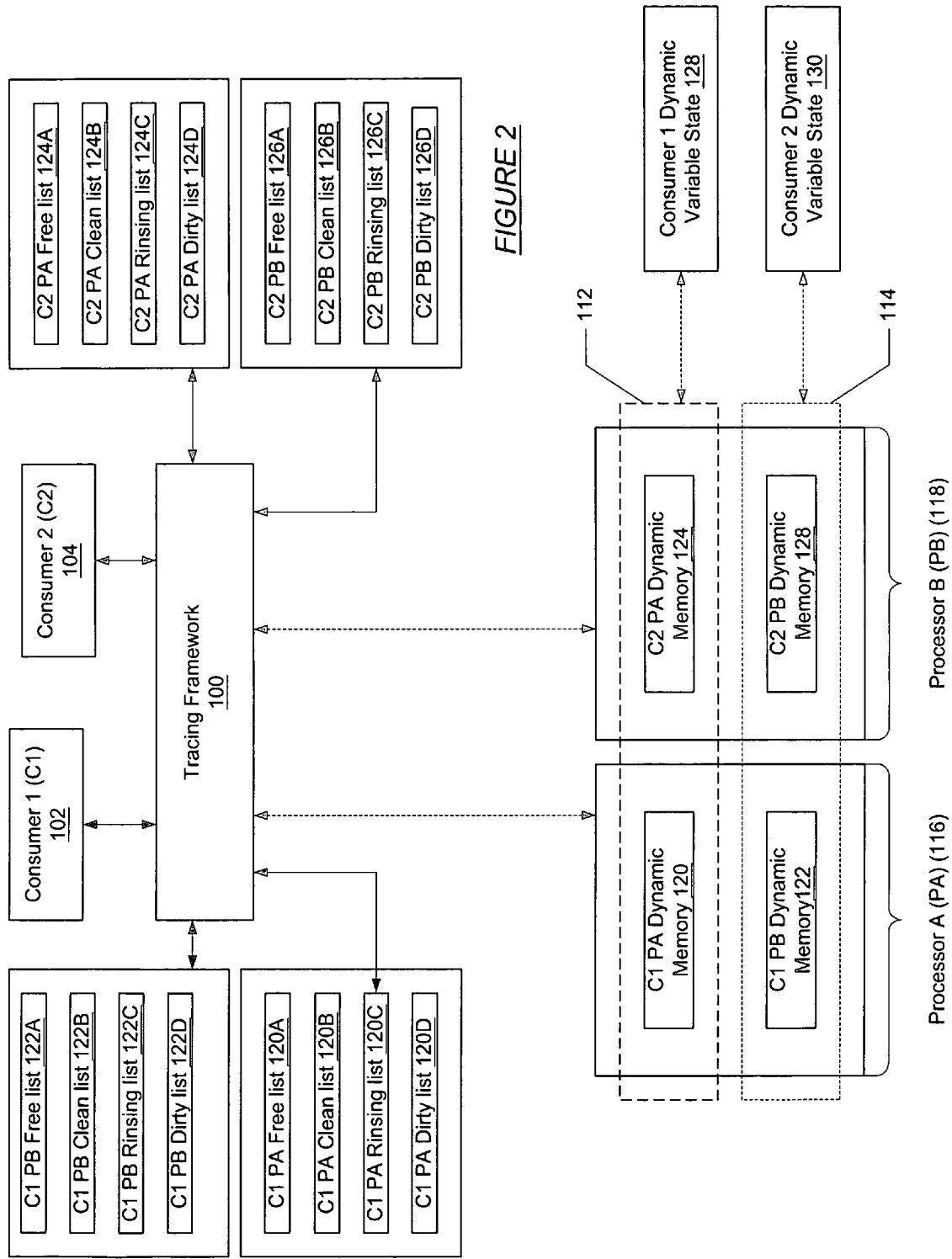
FIG. 2 shows a flow diagram in accordance with one embodiment of the invention.

FIG. 2 shows a flow diagram in accordance with one embodiment of the invention. As shown in FIG. 2 each consumer (i.e., Consumer 1 (102) and Consumer 2 (104)) is associated, via the tracing framework (100), with a block of dynamic memory (112, 114) and a per-consumer dynamic memory state (i.e., Consumer 1 Dynamic Memory State (128) and Consumer 2 Dynamic Memory State (130)). In one or more embodiments of the invention, the consumer dynamic memory state may be set to: FREE indicating that data chunks (defined below) are available to allocate; CLEAN indicating that data chunks may be allocated but are not yet on the free list (defined below); RINSING indicating that no data chunks are currently available to allocate, as they are in the asynchronous cleaning process (see FIG. 7 below), but they will be available in the near future; DIRTY indicating that there are no data chunks available to allocate; and EMPTY indicating that all data chunks are in use and that no data chunks are currently in a dirty list (defined below).

Continuing with the discussion of FIG. 2, each block of dynamic memory (112, 114) is distributed across the processors (i.e., Processor A (116) and Processor B (118)) within the system. In this case, each block of dynamic memory (112, 114) is distributed across two processors (116, 118) resulting in a Consumer 1 Processor A ("C1 PA") dynamic memory block (120), a Consumer 1 Processor B ("C1 PB") dynamic memory block (122), a Consumer 2 Processor A ("C2 PA") dynamic memory block (124), and a Consumer 2 Processor B ("C2 PB") dynamic memory block (126). In addition, each dynamic memory block on each processor (i.e., 120, 122, 124, 126) is associated, via the tracing framework (100), with a series of lists (132, 134, 136, 138) defining the state of the various data chunks (defined below) within each per-consumer memory block (i.e., 120, 122, 124, 126).

Each list in the aforementioned series of lists (132, 134, 136, 138) includes a free list, a clean list, a rinsing list, and a dirty list, i.e., 120A, 120B, 120C, 120D, respectively, associated with the C1 PA dynamic memory block (120);

122A, 122B, 122C, 122D, respectively, associated with the C1 PB dynamic memory block (122); 124A, 124B, 124C, 124D, respectively, associated with the C2 PA dynamic memory block (124); and 126A, 126B, 126C, 126D, respectively, associated with the C2 PB dynamic memory block (126).

In one embodiment of the invention, the free list (120A, 122A, 124A, 126A) includes data chunks (described below) available for allocation. The clean list (120B, 122B, 124B, 126B) includes data chunks ready for allocation but not presently on the free list (120A, 122A, 124A, 126A). The rinsing list (120C, 122C, 124C, 126C) includes deallocated data chunks that are currently being asynchronously cleaned (described below in FIG. 7). The dirty list (120D, 122D, 124D, 126D) includes deallocated data chunks, which have not been asynchronously cleaned.

As noted above, the dynamic variables are allocated in the memory blocks within data chunks (i.e., segments of memory within the memory block). In one embodiment of the invention, the size of a data chunk is statically defined. The size of the data chunk, in this embodiment, may be determined by static analysis of tracing actions (i.e., actions defined by the consumer which the tracing framework performs when a particular probe is encountered). The analysis may be performed on all trace actions before any probes are enabled. Specifically, the analysis may be performed on all tracing actions that include, for example, a dynamic load, or a dynamic store instruction. By analyzing such tracing actions, the dynamically-allocated size of the dynamic variables loaded/stored by the tracing action plus the storage required to key the dynamic variables (i.e., associated metadata) may be determined and subsequently used to calculate the overall size of the data to be loaded/stored. For all tracing actions, the largest overall size of data may then be used as the size of the data chunk. In one embodiment of the invention, the size of the data chunk may be determined on a per-consumer basis or on a system-wide basis. One skilled in the art should appreciate that the data chunk may also be dynamically defined.

Figure 3:
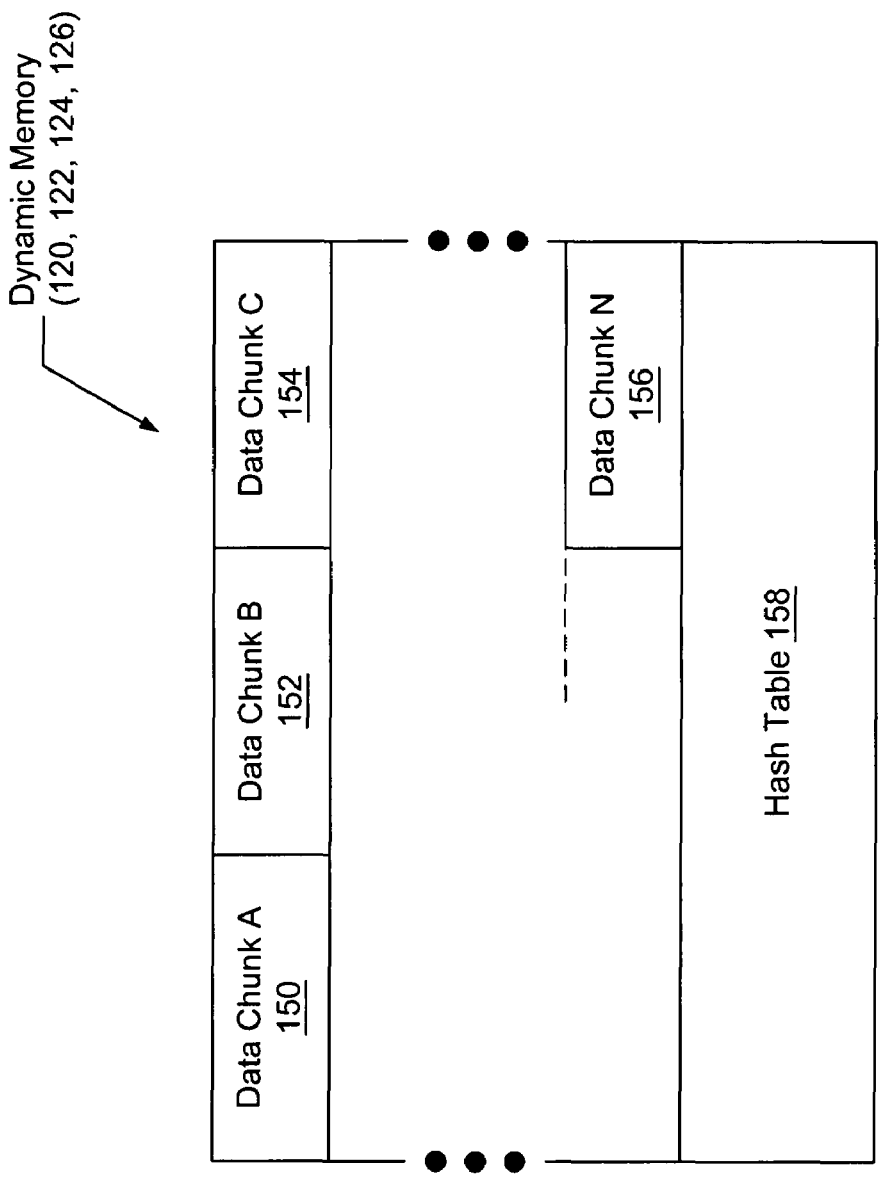
FIG. 3 shows a memory layout in accordance with one embodiment of the invention.

In one embodiment of the invention, once the size of the data chunk has been set, the dynamic memory blocks (i.e., 120, 122, 124, 126) may be initialized. FIG. 3 shows a memory layout in accordance with one embodiment of the invention. More specifically, FIG. 3 the shows the layout of a dynamic memory block in accordance with one embodiment of the invention. The dynamic memory block (120, 122, 124, 126) is divided into two portions. One portion includes a hash table (158) that is wide enough to have every data chunk (e.g., Data Chunk A (150), Data Chunk B (152), Data Chunk C (154), Data Chunk N (156)) in an individual hash bucket (see FIG. 4 below). The second portion includes the data chunks (e.g., Data Chunk A (150), Data Chunk B (152), Data Chunk C (154), Data Chunk N (156)) referenced by the hash table (158).

Figure 4:
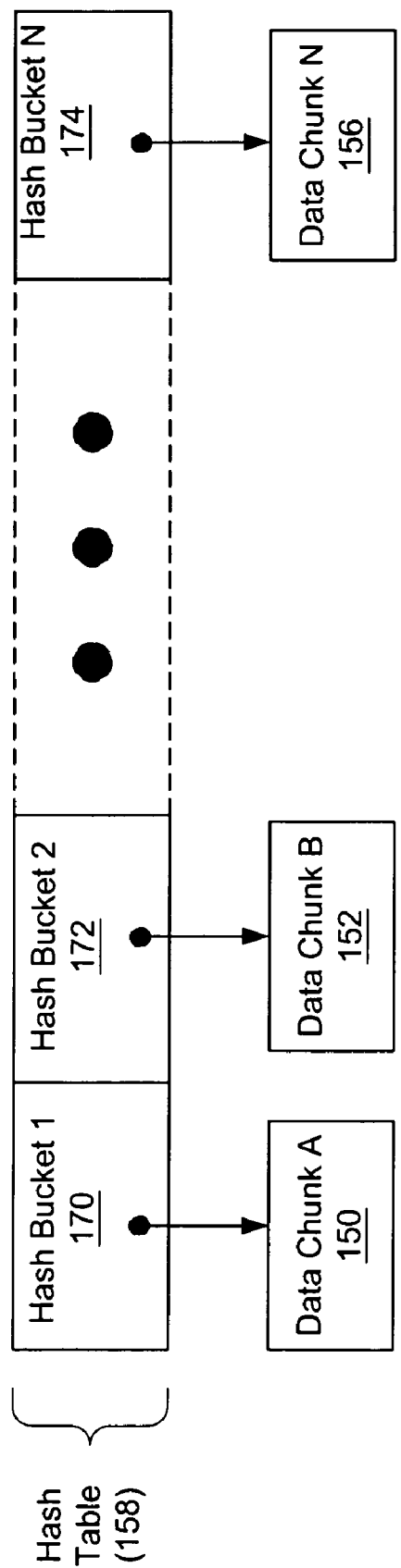
FIG. 4 shows a memory layout in accordance with one embodiment of the invention.

FIG. 4 shows a memory layout in accordance with one embodiment of the invention. More specifically, FIG. 4 provides a more detailed view of the dynamic memory block (120, 122, 124, 126) shown in FIG. 3. Specifically, the hash table (158) includes a one-to-one hash bucket to date chunk ratio. Thus, hash bucket 1 (170) references only data chunk A (150) (i.e., hash bucket 1(170) has a one-element hash chain). Similarly, hash bucket 2 (172) references only data chunk B (152), and hash bucket N (174) references only data chunk N (156).

Figure 5:
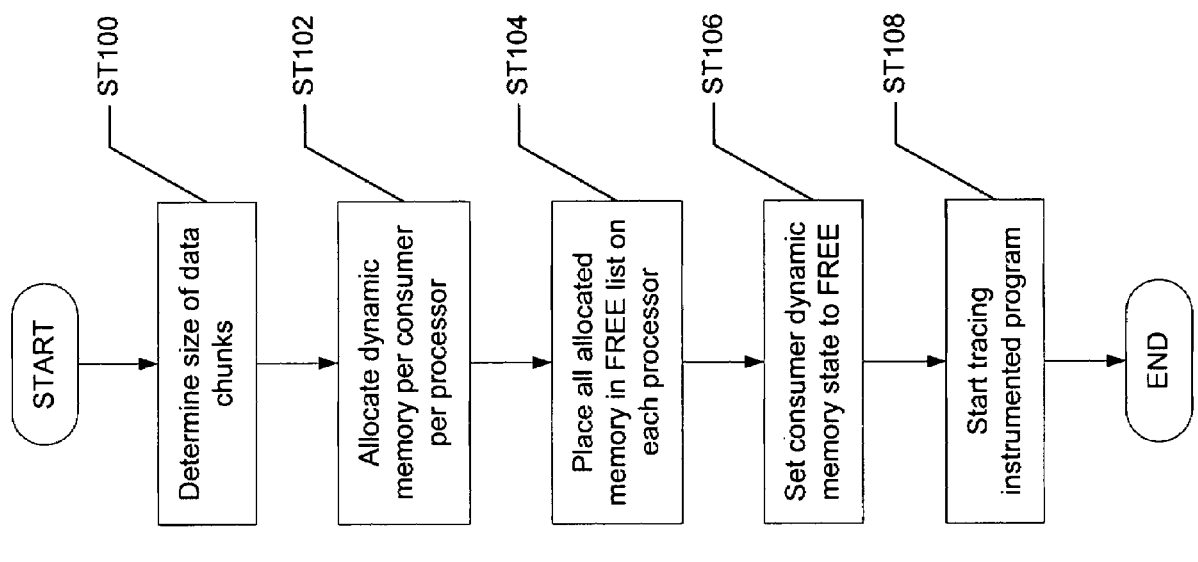
FIG. 5 shows a flowchart in accordance with one embodiment of the invention.

FIG. 5 shows a flowchart in accordance with one embodiment of the invention. More specifically, FIG. 5 shows a method for initializing the tracing framework to dynamically allocate variables in accordance with one embodiment of the invention. Initially, the size of the data chunks is determined, for example, using the method described above (Step 100). The dynamic memory is then allocated by the tracing framework (or a related process) (Step 102). In one or more embodiments of the invention, this may include determining the total amount of dynamic memory to allocate to a particular consumer and how to distribute dynamic memory across the plurality of processors associated with the tracing framework. Alternatively, the tracing framework (or related process) may allocate the dynamic memory to the consumer and distribute it evenly across all processors associated with the tracing framework. In addition, this step includes creation of the necessary data structures within (or associated with) the tracing framework, which are necessary to dynamically allocated variables. These data structures may include, but are not limited to, a series of lists (e.g., 120A, 120B, 120C, 120D) and a per-consumer dynamic memory state (e.g., 128).

Continuing with the discussion of FIG. 5, once the dynamic memory has been allocated and the associated data structures created, all the data chunks within the allocated memory, or more specifically references to all the data chunks, are place in the per-consumer per-processor free list (Step 104). The per-consumer dynamic memory state (e.g., 128) is then set to FREE (Step 106). The tracing framework may then commence tracing (Step 108).

Figure 6:
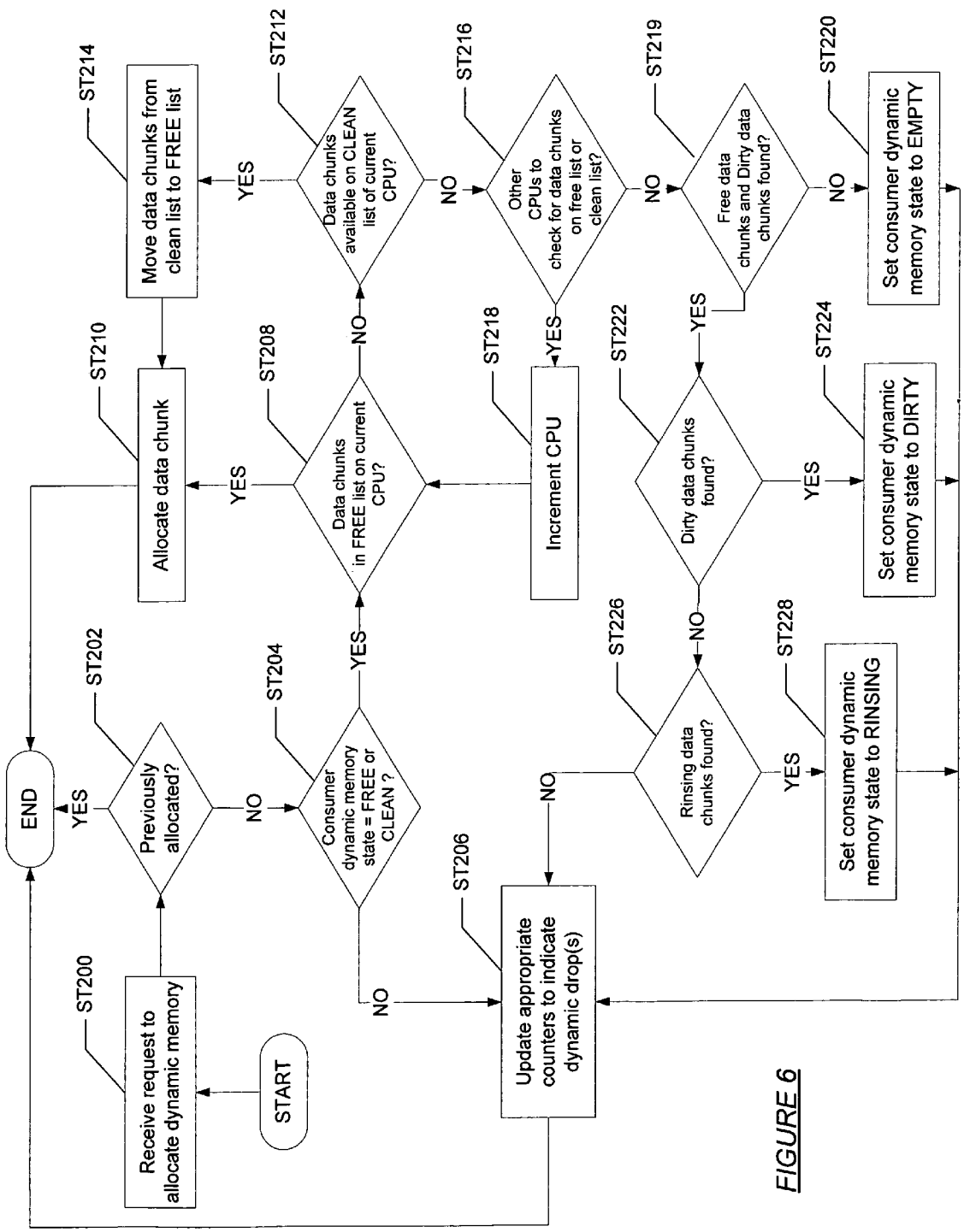
FIG. 6 shows a flowchart in accordance with one embodiment of the invention.

FIG. 6 shows a flowchart in accordance with one embodiment of the invention. More specifically, FIG. 6 shows a method of allocating a dynamic variable in accordance with one embodiment of the invention. Initially, a request to allocate a dynamic variable, typically in the form of a dynamic load or dynamic store operation, is received (Step 200). The tracing framework then determines if the dynamic variable has been previously allocated (Step 202). If the dynamic variable has been previously allocated, then the method ends. Otherwise, the tracing framework determines if the consumer dynamic memory state is FREE or CLEAN (Step 204). Note that the tracing framework includes functionality to determine the consumer and consumer dynamic memory state associated with the probe. If the consumer dynamic variable state is not CLEAN or FREE (Step 204), then the appropriate counters are incremented to indicate that a dynamic drop has occurred (i.e., the dynamic variable could not be dynamically allocated because there are no data chunks available to allocate) (Step 206). Note the dynamic drop(s) may be defined with respect to the value of the consumer dynamic memory state when the drop occurred (e.g., a dirty drop counter is incremented if a dynamic drop occurs when the consumer dynamic memory state is DIRTY). Once the appropriate counters have been updated the process ends.

If the consumer dynamic variable state is CLEAN or FREE (Step 204) the free list associated with the processor that triggered the probe and corresponding to the consumer associated with the triggered probe is queried to determine the presence of a data chunk (Step 208). If a data chunk is available on the free list, then the data chunk is allocated to store the dynamic variable (Step 210).

In one embodiment of the invention, before the allocation is undertaken, the start of the hash chain (i.e., a pointer from the hash bucket) to which the data chunk will be associated with is noted. Later, after the allocation is completed, the pointer from the hash bucket is atomically switched to point to the allocated data chunk. If this fails, because of either concurrent allocations or an allocation concurrent with a deletion, the newly allocated data chunk is deallocated (i.e., a reference to the data chunk is placed in the dirty list), and the entire process of looking up (and potentially allocating) the dynamic variable is reattempted (i.e., Steps 202-210 are repeated) (not shown). This embodiment provides an efficient means to ensure that the same dynamic variable is not stored twice on the same hash chain (i.e., only one copy of the dynamic variable may be stored in any given hash bucket).

Continuing with the discussion of FIG. 6, if no data chunks are available on the free list, then the corresponding clean list is queried to determine the presence of data chunks (Step 212). If data chunks are available on the clean list, then the data chunks are atomically moved to the free list (Step 214), and the method proceeds to step (210) (i.e., allocate the data chunk). If there are no data chunks on the clean list of the current processor (i.e., processor upon which the probe was triggered), then the tracing framework (or a related process) determines whether there are associated processors available to query for data chunks on the free list or the clean list associated with the consumer (Step 216). If processors are available, the tracing framework proceeds to the data structures associated with the next processor (Step 218) and performs Steps 208-216. Steps 208-216 are performed until either a data chunk has been allocated or there are no processors remaining to query (i.e., all processors have been queried).

If it is determined that there are no per-processor data structures remaining to query, then if the tracing framework found no free data chunks and no dirty data chunks (Step 219) the consumer dynamic memory state is atomically set to EMPTY (Step 220). The process then proceeds to Step 206. If dirty data chunks were found while querying the processors in the system (Step 222), then the consumer dynamic memory state is atomically set to DIRTY (Step 224). The process then proceeds to Step 206. If dirty data chunks were not found but rinsing data chunks were found while querying the processors in the system (Step 226), then the consumer dynamic memory state is atomically set to RINSING (Step 228). The process then proceeds to Step 206. If rinsing data chunks are not found, the process then proceeds to Step 206 without changing the value of the consumer dynamic memory state.

The aforementioned references to free lists, dirty lists, etc. are associated with the particular consumer who enabled the probe that was subsequently fired.

The aforementioned method of allocating dynamic variables may be performed in the context of probe firing, i.e., when the probe fires. Thus, as described above, when the aforementioned method is performed, the interrupts of the processor upon which the probe was triggered are disabled. The interrupts are subsequently re-enabled after the tracing framework has completed performing all the actions associated with the fired probe.

In one or more embodiments of the invention, a data chunk is placed on the dirty list when it is deallocated. The deallocation may be directed by the tracing framework. In one embodiment of the invention, a single-word atomic operation may not be typically used to remove the data chunk because deallocations require the deletion of a data chunk from the middle of a hash bucket. Accordingly, a spin lock is added to each hash bucket for use during deallocations. Further, this spin lock is only held for the duration of the removal of the data chunk and released prior to returning control back to the tracing framework to continue performing actions associated with the triggered probe.

In one or more embodiments of the invention, an asynchronous cleaner is used to "clean" the dirty data chunks, thereby making them available for reallocation. The cleaner performs a series of steps to ensure that, once the data chunks have been cleaned, all processors have completed manipulating the dynamic variable, and the data chunks in which the dynamic variable resides are free to be reallocated to a new dynamic variable.

Figure 7:
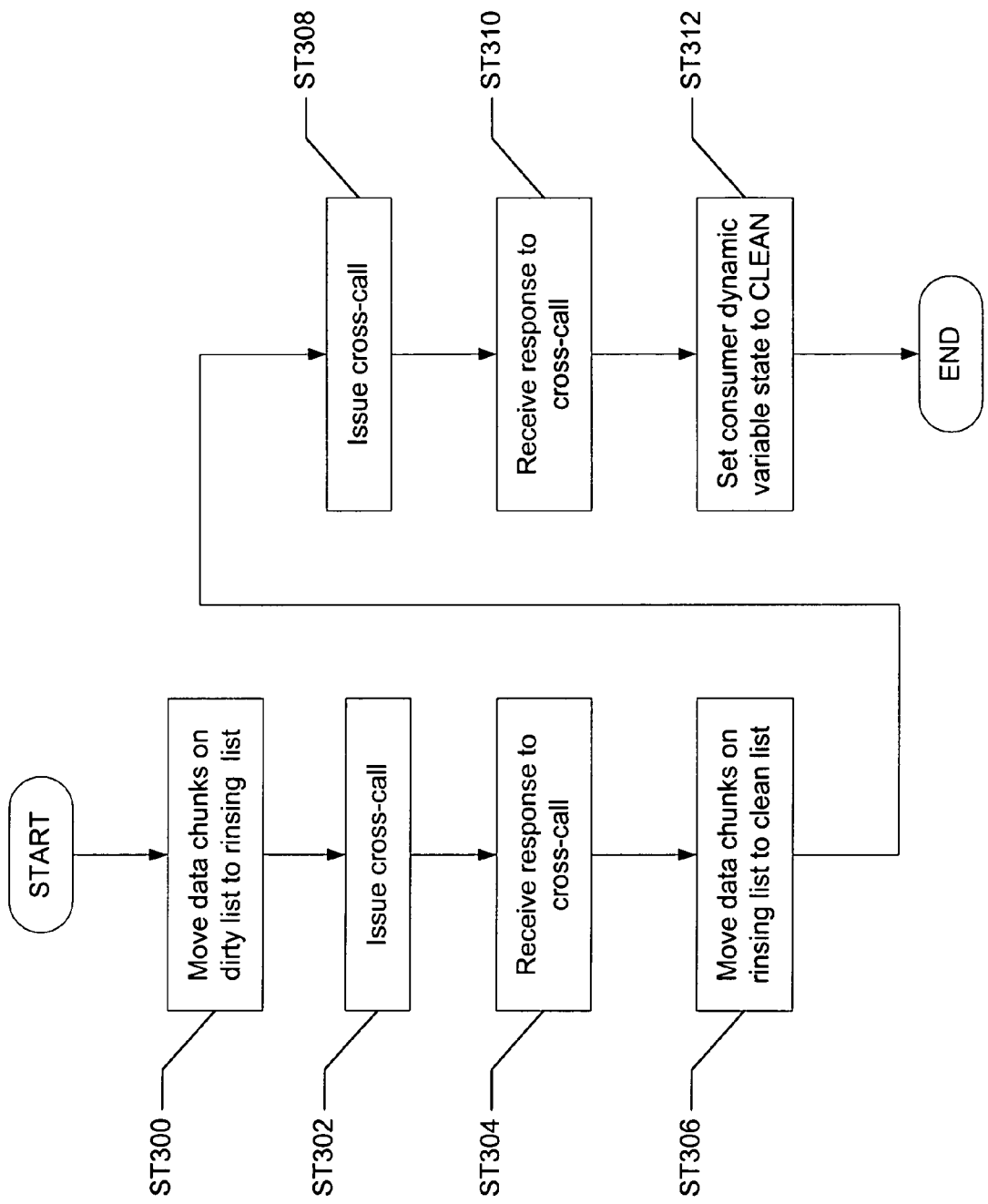
FIG. 7 shows a flowchart in accordance with one embodiment of the invention.

FIG. 7 shows a flowchart in accordance with one embodiment of the invention. More specifically, FIG. 7 shows a flowchart detailing a method employed by the cleaner to "clean" the dirty data chunks in accordance with one embodiment of the invention. Note that following process may be performed on a per-consumer basis or, alternatively, on a per-system basis. Initially, data chunks on the dirty list for all processors in the system, are moved to the corresponding rinsing list (Step 300). The cleaner then issues a cross-call to all processors in the system (Step 302). Conceptually, the cross-call "pings" each of the processors within the system and waits for a response. Because of the manner in which the actions associated with a probe are executed when a probe is triggered, namely disabling and enabling interrupts, the cross-call provides an efficient means to determine if a given processor is performing an action associated with a probe or is executing the instrumented program outside the tracing framework.

Thus, when the cross-call is issued, all processors whose interrupts are enabled will acknowledge the "ping." However, those whose interrupts are disabled will not acknowledge the "ping" until the interrupts are subsequently re-enabled. At that time, the processor will acknowledge the "ping." Once a response to the cross-call is received (Step 304), the data chunks on the rinsing lists of all processors within the system are moved to the clean list (Step 306). The cleaner then issues a cross-call, in the manner described above, to all processors in the system (Step 308). Once a response to the cross-call is received (Step 310), the cleaner has ensured that all processors have seen the clean list as updated in Step 306. The cleaner subsequently sets the consumer dynamic memory state to CLEAN. In one or more embodiments of the invention, the rate at which the cleaner performs the aforementioned method is tunable by the user.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of dynamically allocating a variable in a tracing framework, comprising:

allocating dynamic memory in the tracing framework, having a plurality of data chunks;

placing at least one of the plurality of data chunks onto a free list;

encountering an enabled probe of an instrumented program;

performing an action associated with the enabled probe, based on encountering the enabled probe;

allocating the at least one of the plurality of data chunks on the free list to store the variable and removing the at least one of the plurality of data chunks from the free list, wherein the variable is associated with the action;

deallocating the at least one of the plurality of data chunks and placing the at least one of the plurality of data chunks on a dirty list; and cleaning the at least one of the plurality of data chunks on the dirty list using a cleaning procedure to place the at least one of the plurality of data chunks on the free list, wherein the dynamic memory comprises first dynamic memory from a first processor and second dynamic memory from a second processor, and wherein the cleaning procedure comprises:
moving one of the plurality of data chunks from the dirty list to a rinsing list if dirty list is not empty,
issuing a first cross-call to the first processor and the second processor,
moving one of the plurality of data chunks from the rinsing list to a clean list if the rinsing list is not empty upon receiving a response to the first cross-call,
issuing a second cross-call to the first processor and the second processor, and
setting a consumer dynamic memory state to clean in response to the second cross-call.

2. The method of claim 1, further comprising:
associating the dynamic memory with the consumer dynamic memory state, wherein the consumer dynamic memory state is associated with a tracing consumer, and wherein the tracing consumer is associated with the tracing framework.

3. The method of claim 2, further comprising:
setting the consumer dynamic memory state after searching for the at least one of the plurality of data chunks to allocate.

4. The method of claim 2, wherein the consumer dynamic memory state is set to empty if all of the plurality of data chunks are allocated.

5. The method of claim 2, wherein the consumer dynamic memory state is set to dirty if all of the plurality of data chunks are either allocated or on the dirty list.

6. The method of claim 2, wherein the consumer dynamic memory state is set to rinsing if all of the plurality of data chunks are either allocated or on the rinsing list.

7. The method of claim 1, further comprising:
querying the clean list for one of the plurality of data chunks if the free list is empty; and
moving one of the plurality of data chunks from the clean list to the free list if the clean list is not empty.

8. The method of claim 1, further comprising:
determining whether the variable has been previously allocated; and
not allocating the variable if the variable has been previously allocated.

9. The method of claim 1, wherein the dynamic memory is associated with a tracing consumer, and wherein the tracing consumer is associated with the tracing framework.

10. The method of claim 1, wherein a size of the at least one of the plurality of data chunks is static.

11. The method of claim 1, wherein the dynamic memory is indexed using a hash table.

12. A system for dynamically allocating a variable, comprising:
a dynamic memory configured to store a plurality of data chunks;
a consumer dynamic memory state associated with the dynamic memory, configured to store a state of the dynamic memory;
a tracing framework configured to allocate the variable to one of the plurality of data chunks using the consumer dynamic memory state, wherein the tracing framework comprises:

a free list configured to store at least one of the plurality of data chunks available for allocation, and
a dirty list configured to store at least one of the plurality of data chunks that has been deallocated; and a cleaner configured to move one of the plurality of data chunks on the dirty list to the free list using a cleaning procedure,
wherein the variable is associated with an action,
wherein the action is associated with an enabled probe of an instrumented program,
wherein the action is performed based on encountering the enabled probe,
wherein the dynamic memory comprises first dynamic memory from a first processor and second dynamic memory from a second processor, and wherein the cleaning procedure comprises:
moving one of the plurality of data chunks from the dirty list to a rinsing list if dirty list is not empty,
issuing a first cross-call to the first processor and the second processor,
moving one of the plurality of data chunks from the rinsing list to a clean list if the rinsing list is not empty upon receiving a response to the first cross-call,
issuing a second cross-call to the first processor and the second processor, and
setting the consumer dynamic memory state to clean in response to the second cross-call.

13. The system of claim 12, further comprising:
a tracing consumer configured to define a probe and a corresponding action.

14. The system of claim 13, wherein the tracing framework is configured to dynamically allocate the variable in accordance with the action.

15. The system of claim 12, wherein the tracing framework is configured to set the consumer dynamic memory state after searching for at least one of the plurality of data chunks to allocate.

16. The system of claim 15, wherein the consumer dynamic memory state is set to empty if all of the plurality of data chunks are allocated.

17. The system of claim 15, wherein the consumer dynamic memory state is set to dirty if all of the plurality of data chunks are either allocated or on the dirty list.

18. The system of claim 15, wherein the consumer dynamic memory state is set to rinsing if all of the plurality of data chunks are either allocated or on the rinsing list.

19. The system of claim 12, wherein the dynamic memory is indexed using a hash table.

20. A network system having a plurality of nodes, comprising:
a dynamic memory configured to store a plurality of data chunks;
a consumer dynamic memory state associated with the dynamic memory configured to store a state of the dynamic memory;
a tracing framework configured to allocate a variable to one of the plurality of data chunks using the consumer dynamic memory state;
a free list configured to store at least one of the plurality of data chunks available for allocation;
a dirty list configured to store at least one of the plurality of data chunks that has been deallocated; and
a cleaner configured to move one of the plurality of data chunks on the dirty list to the free list using a cleaning procedure,
wherein the variable is associated with an action, wherein the action is associated with an enabled probe of an instrumented program, wherein the action is performed based on encountering the enabled probe, wherein the dynamic memory executes on any node of the plurality of nodes, wherein the consumer dynamic memory state executes on any node of the plurality of nodes, wherein the tracing framework executes on any node of the plurality of nodes, wherein the dynamic memory comprises first dynamic memory from a first processor, second dynamic memory from a second processors wherein the free list executes on any node of the plurality of nodes, wherein the dirty list executes on any node of the plurality of nodes, wherein the cleaner executes on any node of the plurality of nodes, and wherein the cleaning procedure comprises:

moving one of the plurality of data chunks from the dirty list to a rinsing list if dirty list is not empty, issuing a first cross-call to the first processor and the second processor, moving one of the plurality of data chunks from the rinsing list to a clean list if the rinsing list is not empty upon receiving a response to the first cross-call, issuing a second cross-call to the first processor and the second processor, and setting the consumer dynamic memory state to clean in response to the second cross-call.

\* \* \* \* \*